United States Patent
Roscoe et al.

(10) Patent No.: US 9,118,196 B2
(45) Date of Patent: Aug. 25, 2015

(54) DISTRIBUTED POWER GENERATION

(75) Inventors: Andrew J Roscoe, Glasgow (GB); Richard C Knight, Derby (GB); David R Trainer, Derby (GB)

(73) Assignee: ROLLS-ROYCE plc, London (GB)

( * ) Notice: Subject to any disclaimer, the term of this patent is extended or adjusted under 35 U.S.C. 154(b) by 843 days.

(21) Appl. No.: 13/318,390

(22) PCT Filed: Apr. 29, 2010

(86) PCT No.: PCT/EP2010/055798
§ 371 (c)(1),
(2), (4) Date: Dec. 20, 2011

(87) PCT Pub. No.: WO2010/130583
PCT Pub. Date: Nov. 18, 2010

(65) Prior Publication Data
US 2012/0104847 A1      May 3, 2012

(30) Foreign Application Priority Data

May 14, 2009   (GB) .................................. 0908215.7

(51) Int. Cl.
*H02J 1/10*   (2006.01)
*H02J 3/38*   (2006.01)
(Continued)

(52) U.S. Cl.
CPC . *H02J 3/005* (2013.01); *H02J 3/00* (2013.01); *H02J 3/38* (2013.01); *H02J 4/00* (2013.01);
(Continued)

(58) Field of Classification Search
CPC .............. H02J 9/06; H02J 9/00; H02J 3/005; H02J 3/14; H02J 9/04; H02J 2003/001; H02J 2003/003; H02J 2003/388

USPC ......................................... 307/23, 24, 30, 64
See application file for complete search history.

(56) References Cited

U.S. PATENT DOCUMENTS

| | | | |
|---|---|---|---|
| 2005/0116814 A1* | 6/2005 | Rodgers et al. | 340/310.01 |
| 2005/0125243 A1 | 6/2005 | Villalobos | |
| 2006/0276938 A1 | 12/2006 | Miller | |
| 2011/0068631 A1* | 3/2011 | Roscoe | 307/69 |

FOREIGN PATENT DOCUMENTS

| | | |
|---|---|---|
| JP | A-2001-008380 | 1/2001 |
| WO | WO 2009/052451 A2 | 4/2009 |

OTHER PUBLICATIONS

Østergaard et al., "Modelling grid losses and the geographic distribution of electricity," Renewable Energy, Jun. 1, 2005, pp. 977-987, vol. 30, No. 7.

(Continued)

*Primary Examiner* — Carlos Amaya
(74) *Attorney, Agent, or Firm* — Oliff PLC

(57) ABSTRACT

Distributed power generation systems generally include a number of power sources and electrical power loads interconnected by a distribution network. Electrical switches and fuses are provided such that local groups of power sources and power loads can be established. Should there be a degradation in the distribution network in terms of a set of criteria such as electrical frequency, current or voltage then the switch or fuse may be thrown to establish each local group as an island. By monitoring divergence from a set of criteria a method and controller may be utilised whereby the distribution network as a whole is considered and configured to establish virtual islands which operate prior to the establishment whether inadvertently or deliberately of actual islands within the distribution network. In such circumstances the transition from normal operation for the distribution network to islanded operation for the distribution network is less severe.

15 Claims, 1 Drawing Sheet

(51) Int. Cl.
*H02J 9/00* (2006.01)
*H02J 3/00* (2006.01)
*H02J 4/00* (2006.01)

(52) U.S. Cl.
CPC ............... *H02J 9/002* (2013.01); *Y10T 307/32* (2015.04); *Y10T 307/344* (2015.04); *Y10T 307/352* (2015.04); *Y10T 307/615* (2015.04)

(56) References Cited

OTHER PUBLICATIONS

Nov. 18, 2010 International Search Report issued in International Application No. PCT/EP2010/055798.

\* cited by examiner

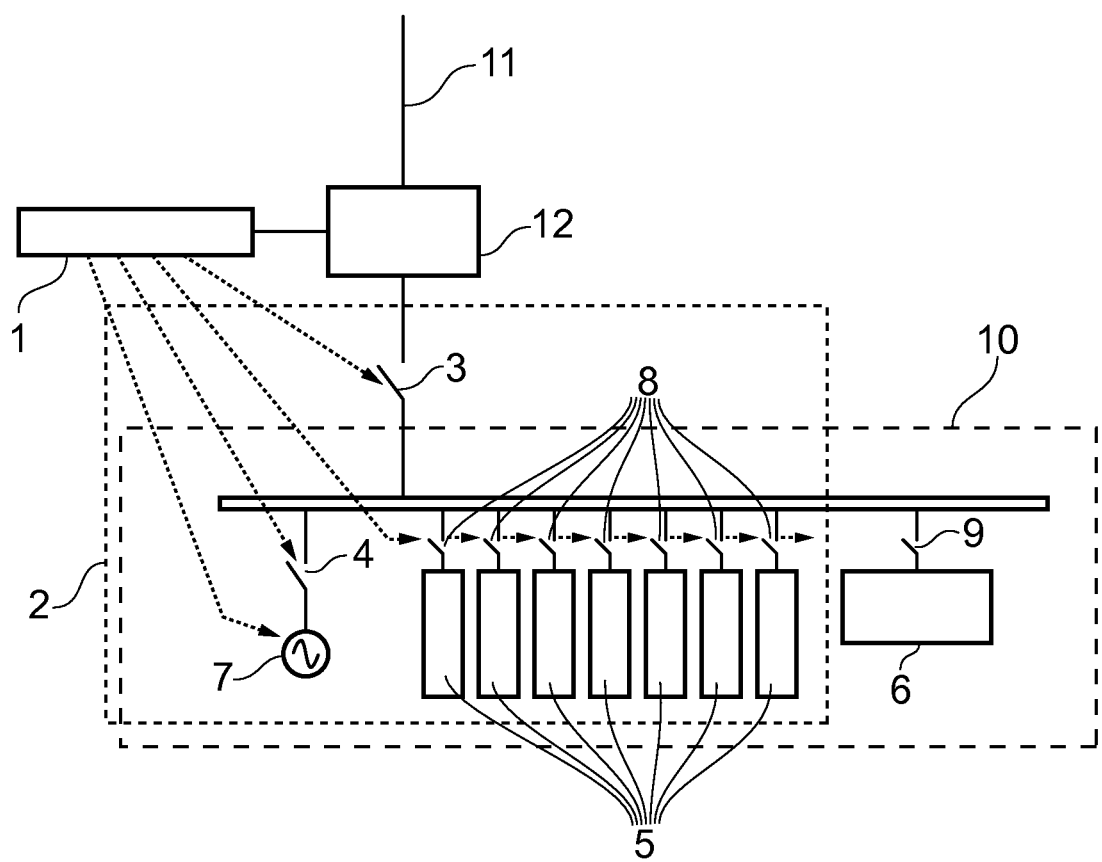

DISTRIBUTED POWER GENERATION

The present invention relates to distributed power generation and more particularly to methods of operating distribution power generation systems in relation to provision of a number of electrical power generation sources providing power to a number of electrical power loads through a distribution network.

It is known to provide distributed power generation systems in which a number of power sources such as main line power generation through major power stations as well as localised generation are combined in a grid to provide the requirements in terms of electrical power consumption to a number of loads. Such distributed power generation systems and methods of operating such systems provide security of supply as well as greater flexibility to meet varying electrical load demands upon a whole network. It will be understood an alternative would be to simply provide one electrical power station for all possible load requirements which clearly would be impractical. Nevertheless, all the electrical power sources and loads must be synchronised upon the system for efficiency.

Current distributed power generation systems can be considered to operate in one of the following manners.
a) The distribution system generally trips off the whole network during fault conditions or frequency/voltage excursions. In such circumstances the generators provide little security of supply benefit for local loads since the whole will go off line when there is a problem in the main power distribution network.
b) By provision of emergency generators that generally sit idle but start automatically should there be a variance from a known power criteria in order to meet a predefined local demand via a changeover switch during power outages from the main distribution network. Such emergency generators provide security of supply to the defined load although there will clearly be a brief delay when the emergency generator starts and until the changeover switch is thrown. Such emergency generators define inflexible power islands which combine power sources or an emergency generator as a sole power source for a fixed number of power loads.
c) By provision of generators which are designed only to operate in island conditions it is possible to create by use of portable generators and generators connected to electrical isolator systems essentially isolated or island local groupings of a power source or sources and power loads substantially matched across the local group or island.
d) In some maritime, military and disaster relief situations generators can be defined which attempt to remain essentially on-line at all times, in such circumstances they are potentially connected together in a multi-generator island but will typically operate on a relatively simple power frequency droop curve with little or no autonomous intelligence for matching.

Problems occur with all the above approaches in that none attempt to fully utilise the reliability of a local generator and the benefits of attaching that generator to a wider network. These benefits include better power system stability in terms of frequency, voltage etc., more flexibility and power sharing between generators allowing individual generator maintenance to take place while power is supplied by other loads and better economic performance by allowing power sharing between generators based upon electrical demand, network constraints, fuel costs and availability of a particular generator at any particular time.

It will be understood that a wire network inevitably will become unreliable the larger that network becomes due to the number of potential failures or power outages which may occur. However transition to a local power system or group containing at least one electrical power source in the form of a generator itself can produce a so-called islanded state in order to provide for local electrical power demands whilst the wider parent network is unavailable. It will be understood that this is inherently the purposes of an emergency generator as a power source but normally there is a delay in the generator start up and fixed load configuration requirements for such generators limit their effectiveness. If there is a so-called uninterruptible power supply (UPS) requirement it is normally necessary to add to the emergency generator an expensive battery or other storage device e.g. flywheel to act to provide emergency power during the period of emergency generator start up. By such an approach it will be understood that there is an uninterruptible power supply even over the potentially few minutes until an appropriate emergency generator is fully on-line and providing electrical power to a local group distribution network. However it will also be understood that neither emergency generators nor UPS systems present optimal return on investment since most of the apparatus and equipment is idle for most of its life.

Recent increases in the utilisation of distributed generation has opened up the possibility of greater security of supply by allowing individual generators in a local group to operate in a so-called islanded mode when they act in a similar fashion but generally more effective manner of an emergency generator or UPS system.

Attached FIG. 1 provides an illustration of a typical distributed power generation system in which a controller 1 is arranged to monitor through external controls local current CT and voltage VT at various nodes within the system. The controller 1 will typically also monitor through appropriate instrumentation and sensor signals from such devices as tachometers, condition and monitoring signals and other criteria with regard to distributed network operation. The inputs to the controller 1 enable the controller 1 itself to change operation of the generator or provide variations in generators at different positions or adapt or alter the electrical loads included within a local group distribution network as an electrical power island. It will be understood that the settings presented by the controller 1 may change or be updated at a predetermined regular or irregular interval typically on a second by second basis. In such circumstances it will be appreciated that the controller 1 has control and influence over a number of devices within dotted line 2. In the illustration this includes two breaker or contact switch elements 3, 4 as well as loads upon the local group distribution network 10, that is to say controllable loads 5 of a known nature and uncontrolled loads 6. The switch 4 enables switching of a generator 7 into the local group distribution network 10 whilst the switch 3 relates to switching a potential local group distribution network 10, or electrical power island, into the main distribution network 11.

It will be understood that the controller 1 in such circumstances sets the generator 7 output via control links dependent upon prime mover and generator type accounting for current electrical power operating conditions. The controller 1 also controls the connection of local controllable loads 5 which essentially means that each controllable load 5 is given a priority order to enable it to be disconnected or connected to a local group distribution network, or power island 10, dependent upon the generator 7 having sufficient capacity to serve all such loads. The controllable loads 5 in such circumstances may be considered critical loads to varying extents which must be protected in order to ensure operability in emergency or other situations. Uncontrolled loads 6 cannot be simply switched into or out of operation dependent upon whether the generator 7 can meet any surplus power requirements over and above the controllable loads 5.

It will be understood that in a transition from a grid connected situation to an islanded local group distribution network 10 operation state there are two potential causes. Firstly, the island is formed unintentionally due to a break in the connection between the local group distribution network 10 and the main network 11. Alternatively, the island can be formed intentionally by disconnecting the local group distribution network 10 from the main network 11 such intentional disconnection would involve the controller 1 throwing the switch 3 to create a power island comprising source 7 and controllable loads 5.

In the first situation, that is to say loss of connection to the overall main network 11 some form of protection of islanding must occur. Such detection may include loss of mains (LOM) protection associated with the other generator in the local group distribution network 10 or the local network itself. Detection can be by a so-called rate of change of frequency (ROCOF) relay or other suitable detection method. Immediately upon power islanding being detected it will be understood that the local group distribution network 10 and/or the local generator 7 must be disconnected from the main distribution network 11 to avoid synchronisation problems when the main network 11 becomes live again at the point of common coupling to the local group distribution network 10. It will also be understood that such an approach addresses safety concerns on the main network 11 where it might be that electrical feedback from the local generator 7 could be presented on the main distribution network 11 when that main distribution network 11 is in a de-energised state for maintenance. The traditional approach is that the local generator 7 should be disconnected completely. Alternatively, switch 3 may be opened to form a deliberately managed power island. In the seconds that follow disconnection the local generator 7 power output may have to change rapidly to match local demand. It will be understood that typically local predefined and priority based algorithmic electrical load shedding schemes are typically activated to match local electrical power demand to the local power generating capacity, that is to say local generator 7. The effects of such switching results in frequency fluctuations within the local group distribution network 10 (power island or local group) as loads are removed or added whilst the prime mover/local generator 7 controls are adjusted. The magnitudes of fluctuations or changes will depend upon a number of factors including the size of load steps, the response time of the prime mover for the generator 7 and the generator controls itself as well as the rotational inertia of loads, generators and prime movers in operation. In some adverse circumstances even the best control regimes may not be able to avoid a local frequency excursion of a magnitude large enough to require tripping of the local generator 7 out of operation. Such tripping of the local generator 7 or power source out of operation will cause a loss of electrical power supply until local generation can be restarted/reconnected or supplies recovered by other means, that is to say from the main network 11. Clearly, provision of auxiliary or emergency electrical power generation requires that the local group distribution network 10 or island of power source and electrical loads is maintained as an operational entity in as many situations as possible. Ideally the highest priority loads should be supplied electrical power at all times throughout an islanding process.

The present invention provides a method of operating a distributed power generation system comprising a plurality of electrical power sources and a plurality of electrical loads interconnected by a main distribution network, one or more switches for forming one or more local group distribution networks, each local group distribution network comprising at least one electrical power source and at least one electrical load, the method comprising monitoring the main distribution network by comparing the electrical power flow with a set of criteria, determining if the electrical power flow on the main distribution network diverges from the set of criteria, maintaining the switch between at least one of the local group distribution networks and the main distribution network closed and configuring the at least one of the local group distribution networks whereby the electrical power from the or each electrical power source within the at least one of the local group distraction networks substantially matches the electrical power requirements of the electrical loads in the at least one of the local group distribution networks if the electrical power flow in the main distribution network diverges from the set of criteria.

The present invention also provides a distributed power generation system comprising a plurality of electrical power sources and a plurality of electrical loads interconnected by a main distribution network, one or more switches for forming one or more local group distribution networks, each local group distribution network comprising at least one electrical power source and at least one electrical load, the distributed power generation system comprising at least one controller arranged to monitor the main distribution network, the controller being arranged to compare the electrical power flow with set of criteria, the controller being arranged to determine of the electrical power flow on the main distribution network diverges from the set of criteria, the controller being arranged to maintain the switch between the at least one of the local group distribution networks and the main distribution network closed and the controller being arranged to configure the at least one of the local group distribution networks whereby the electrical power from the or each electrical power source with the at least one of the local group distribution networks substantially matches the electrical power requirements of the electrical loads in the at least one of the local group distribution networks if the electrical power flow in the main distribution network diverges from the criteria.

Other aspects of the present invention are defined in the description below and/or the claims.

Aspects of the present invention will now be described by way of example with reference to FIG. 1 already introduced.

It will be appreciated that with regard to a distributed power generation system anticipation of an islanding situation would be beneficial with regard to meeting the requirements of that island as a local group distribution network comprising power sources and loads if the island state precipitates itself subsequently. Traditionally as indicated above it is known to provide emergency generators and other systems which are normally idle in order to ensure such emergency generators and UPS elements, that is to say batteries etc. are available to sustain the local group distribution network island, e.g. when necessary. In such circumstances the elements of the potential island incorporate relatively expensive and as indicated normally idle elements which will only be utilised sporadically if at all. By detecting deterioration in performance, that is to say the quality of a main distribution network as a whole it is possible to deliberately prepare particular local group distribution networks comprising power sources and loads to operate in a state which will be satisfactory should the island be established. Thus, if electrical power supplies should fail or the power quality degrades to an unacceptable level then by such prior reconfiguration transition to the islanded state with regard to the local group distribution network of power sources and loads may be smoother and more controlled.

It will be understood that not all problems with regard to a distributed power generation system and in particular islanding can be detected before they occur but generally events such as loss of a major generator or a transmission line can cause a more gradually cascading failure which may take several seconds or minutes. By monitoring deterioration in electrical power quality such as with regard to voltage, frequency, imbalance, flicker and harmonics it is possible that a controller 1 as described above with regard to FIG. 1 can take pre-emptive action to essentially configure local group distribution networks of power sources and loads as a virtual islanding state. In such circumstances the pre-configured local group distribution networks may continue to operate within the context of the whole main distribution network but be readied for an islanding state, that is to say operation essentially independently dependent upon matching power source and load requirements within the local group distribution network if and when required.

Once in the virtual islanded state and stabilised in that state local power generation will substantially match local demand such that subsequent deliberate or unexpected transition to an islanded mode for the local group distribution network will produce less frequency and voltage deviations than would a sudden unexpected islanding state. Such frequency and voltage deviations would at least remain within acceptable bounds for equipment providing the electrical power sources and electrical power loads. Furthermore transitions to an islanded mode for local group distribution networks of power sources and power loads can be stepped and deliberate dependent upon the deviation from a measured set of criteria. Essentially there would be determination of a measured degradation in the set of criteria with regard to power quality and as a result a reciprocal adjustment of the power source and power loads within a local group distribution network should the independent island eventually be created. Essentially it will be understood that local matching of electrical power supply from the local power source and local loads is provided so that the local electrical loads are still supplied despite a breakdown elsewhere. Clearly, generally electrical power loads will be graded and prioritised and it will be these graded and prioritised loads or those loads which have the highest priorities which will be matched with the electrical power sources with a local group distribution network.

In order to achieve aspects of the present invention it is important that the distributed power generation system can consider each electrical power source and each electrical load or groups of loads individually through switchability in order to construct virtual local group distribution networks, e.g. virtual islands, which can be switched into practicality either deliberately or unintentionally. In such circumstances transitions to an island mode can occur as part of a deliberate process instigated by the controller 1 due to further degradation in the main distribution network power quality or as a result of unintentional total main distribution network power loss.

According to aspects of the present invention a sufficiently poor or degrading main distribution network performance is detected. Once such degradation or reduction in the main distribution network performance based upon a specific criteria such as voltage, frequency or fluctuations is determined the controller 1 enters a virtual local group distribution network e.g. a virtual islanding state. In this virtual islanding state typically the following actions are performed.

a) Electrical load shedding algorithms quickly and gradually shed electrical load so that the local load magnitude in terms of all the power loads combined remains within the available electrical power output from a local electrical generator or generators. Typically electrical loads will be shed such that loads with the lowest priority will be shed first. Algorithms to shed electrical loads depend upon the amount of instrumentation available within a local group distribution network which defines that part of the main distribution network combining electrical power sources and electrical loads within the main distribution network as a switchable area. If the electrical power flows to all electrical loads are known then the load shedding can be almost instantaneous using a quite simple algorithm, that is to say a simple balance between available electrical power generation capacity or source capacity and the electrical loads presented upon the local group distribution network. If the bulk of the electrical power flow from the electrical power generator is the sum of all the loads known to exist in the local group distribution network then a more gradual typically iterative and/or adaptive load shedding algorithm may be used. Optionally, some low priority loads may be shed instantaneously and automatically without consideration of priority. Such automatic shedding of electrical load such that there is closer approximation to electrical power capacity may be more rapid but is typically blind and lacks flexibility. It is advantageous if the local group distribution network comprising the local group of electrical power sources and electrical loads can be considered in terms of magnitude such that the controller 1 can then provide control signals which set, that is to say switch on or off, the electrical loads dependent upon requirements for smoothing and controlled establishment of a local group distribution network as required. Essentially it is by considering each local group distribution network as an island and therefore substantially matching the electrical source capacity, whether that be through generators or storage devices with electrical loads in that local group distribution network that greater customising of operation can be achieved. If the controller 1 believes there may be a problem then as indicated it can anticipate the unintentional establishment of a local group distribution network, an island as well as predict the necessity of creating a local group distribution network, an island, with the local group of power sources and power loads should that be required.

b) Typically the electrical power sources as indicated will comprise at least in part electrical generators. The output from the electrical generators themselves can be controlled. Typically electrical generators will include a prime mover. This prime mover may be an engine such that the prime mover throttle can be adjusted so that the electrical power output from the electrical power generator can be more closely matched to local load demand as required. As indicated above typically controls in accordance with aspects of the present invention will have a primary objective of establishing a virtual local group distribution network, a virtual island comprising electrical power sources and electrical loads.

c) Typically the electrical power generator in terms of voltage control can be adjusted in order to achieve a desirable nominal line voltage with droop control applied to avoid excessive reactive electrical power flows. An additional step which can be taken with electrical generators is to establish the generator voltage control so that it can be adjusted slightly. Such slight adjustments ensure that a small but manageable reactive flow is always exchanged with the main distribution network. Such small local voltage excursions will take place should any unintentional islanding occur during the virtual islanding state. The voltage excursions will cause a change in real power flow excursions to the resistive parts of the local loads resulting in a local frequency excursion which itself would trip a rate of change and frequency (ROCOF) relay and detect the unintentional islanding of a local group distribution network comprising electrical power sources and loads.

With a ROCOF algorithm it will be understood it should be possible to detect an unintentional islanding during initial processes even though the real power flow is still substantially matched. For example, by aiming for a reactive electrical power flow which would cause a +3% voltage excursion upon unintentional islanding it will be understood that this will cause a +6% increase in resistive electrical power flow which will typically be enough to create a sufficient frequency slew rate to trip an ROCOF relay algorithm in a relatively short time period. Thus, tripping of the ROCOF relay algorithm will occur without the frequency itself actually deviating beyond allowable limits for operation of the electrical loads within the distributed generation system.

Typically the controller 1 will carry out the above actions a) to c) whilst monitoring the main distribution network performance. If the main distribution network performance improves then typically the controller 1 will exit or move through the graduated virtual island states and return the local group distribution network, that is to say electrical power sources in the form of generators and batteries and local loads to a normal distribution or grid connected operation. However, if the controller 1 determines further degradation in the electrical power set of criteria therefore greater divergence then clearly the controller 1 itself may deliberately act to open the switch 3 to switch the local group distribution network into a practical local group distribution network or island. Thus rather than the controller 1 virtually operating the local group distribution network of electrical power sources and electrical power loads that local group distribution network will be switched out of the overall main distribution network and so will operate to balance the electrical power from the electrical power sources with the electrical power load requirements within the local group distribution network. In such circumstances as a result of the pre-emptive nature of the virtual power island being formed it will be understood that the local loads will then already been substantially or actually pre-matched to the local electrical power generation capacity through the electrical power sources. Consequently any frequency fluctuations upon islanding are much smaller than they would have been had there been an uncontrolled transition to the islanding state by action of a switch or a fuse. Furthermore, any likelihood of a complete local blackout or outage leading to or being caused by frequency collapse of the electrical power generator will be avoided.

As described above generally the controller in accordance with aspects of the present invention will establish the virtual islands by considering the electrical power generator or other sources of electrical power and so shedding electrical load demands within the defined local group distribution network. Thus, the electrical loads will be configured and/or the electrical power sources adjusted to substantially match each other. The closeness of matching as indicated may be relative to the divergence from the set of criteria monitored by the controller for the main distribution network. The electrical load shedding and generator adjustments are typically made during a virtual islanding mode when the stability and ballast effect of the main electrical supply through the main distribution network is still present. Essentially local loads are hypothecated to a particular electrical power source ready for any islanding process. Local network frequency and voltage in such circumstances are stabilised as indicated by the presence of the main distribution network connection whilst the virtual islanding mode is established. Such stabilisation and ballasting of the generation system minimises transience which can occur in local loads during load shedding and generator adjustments to establish the virtual islanding. It will be understood that by such adjustments locally there will be ripple effects in other loads and generators in the main distribution network outside of each individual local group distribution network. Not all local group distribution networks may operate in accordance with aspects of the present invention and in such circumstances these local group distribution network are effectively stabilised by the bulk nature of the overall distribution network ballast by the individual perturbations caused by establishing virtual local islands at least transiently.

Electrical loads can be shed in such circumstances as described above over sensible time frames in a managed fashion rather than suddenly as would be the case with rapid unintentional establishment of islanding. Thus, the actual power islands after a fault will follow the virtual islands as local group distribution networks which were deliberately formed prior to the trip as a result of the fault. Each local group distribution network in such circumstances can be defined such that it is possible to establish a substantially stable equilibrium state with only small voltage excursions which will be within predetermined acceptable limits typically in the order of +/−10%. Such small voltage excursions in any event may be useful for enabling detection of any premature, unintentional islanding which occurs during virtual islanding by the controller through pre-emptive monitoring.

In addition to creation of virtual island controllers in accordance with aspects of the present invention utilise a method which monitors the main distribution network operation against a set of criteria and then establishes the local group distribution networks as virtual islands prior to potential necessity for such consideration. It will be understood that further benefits flow from consideration of the network at both a local and main distribution network level. By such local network and main distribution network consideration even though the method of control in accordance with aspects of the present invention may not actually establish an island itself or need to establish such local group distribution networks as islands the controller will nevertheless provide an indication as to stress within the main distribution network which may be remedied appropriately. During virtual islanding local group distribution networks will generally reduce electrical power exchange with other parts of the main distribution network dependent upon the grade of islanding required by the divergence from the set of criteria. Clearly, if it is envisaged that a island will be established then the net exchange from the local group distribution network in terms of a virtual island to the remainder of the main distribution network will be almost zero. Furthermore, the controller and the method will provide voltage support to the local group distribution network and in such circumstances the main distribution network may export or import VARs as required to maintain nominal line voltage with possible adjustments to maintain a non-zero VAR flow to optimise the performance of islanding-detection relays.

If the local group distribution network when considered as a virtual island is adding to net electrical power demand within the main distribution network prior to determining and establishing of a virtual islanding state then this dependence can be reduced progressively under the control and methodology as described above by the controller to an almost zero demand from the local group distribution network to the main distribution network. Such reduction can be achieved whilst maintaining voltage and maintaining synchronisation between the local group distribution network as an island with the main distribution network. By such an approach it will be understood that stability within the main distribution network is maintained without drawing or adding electrical power to it. Such an approach as indicated above is particularly advantageous when considered as a ballast in establishing the local group distribution network as a virtual island and may enable the main distribution network to remain operational in situations where the divergence from the set of criteria would have led to collapse or degradation. In essence the virtual island defined by the local group distribution network will remove potential perturbations within the main distribution network to allow that main distribution network to continue operationally. The local group distribution network as a virtual island in such circumstances may substantially quarantine potential problems or excesses within the main distribution network for maintenance, repair or analysis.

As described above the establishing of virtual islanding in stages whilst the local group distribution network in terms of power sources and power loads remain practically connected to the main distribution network allows local analysis of the local group distribution network. In such circumstances problems with regard to power quality within the local group distribution network, or virtual island, can be addressed and corrected. Once the problems in power quality within the virtual local group distribution network, or virtual island, have been resolved it will be understood that problems with regard to such power quality will have less effect upon a main distribution network which is weak. It will also be understood that if the main distribution network is broken into at least a number of local group distribution networks which can be considered in virtual islanding states then the action of the virtual islanding method and application of a controller as described above will enable the entire main distribution network to typically maintain a performance above a level at which islanding is required. It will be understood if the whole of the main distribution network must maintain a certain level of performance a rogue local group distribution network may cause a sufficient deviation from the set of criteria whether that be voltage, frequency or current or fluctuation levels which result in the whole of the main distribution network failing. By creating a situation where virtual islands can be defined as quarantine zones it will be understood that the main distribution network can then be synchronised or re-synchronised repeatedly or at least for short term onward emergency operation without the actual necessity for formation of power islands. It will be understood that actual formation of power islands will necessitate re-synchronisation of the whole of the main distribution network which may be inconvenient and time consuming.

It will be understood that in addition to utilisation of virtual islanding for maintenance of operation that entering the virtual islanding mode when necessitated by detection of poor network conditions may also initiate operation of electrical power sources which may normally be idle. These generators may be considered emergency generators or back up generators but in any event will add to the flexibility capacity of the overall distributed power generation system. It will be understood in normal operation typically high efficiency is achieved through a limited number of power generators. In such circumstances each large power generator may have a low cost per electrical power unit but a low number of power generators by implication means that relatively large power islands may be created if one generator should fail. In such circumstances for economic operation a relatively small number of power sources may be considered as the main load power sources but should there be detection of poor network transmission conditions or otherwise a number of emergency generators which are normally idle can be brought to operational speed and therefore create a greater flexibility within the main distribution network. In such circumstances all the electrical power sources will then be able to establish their own local group distribution networks or virtual islands, for flexibility purposes. In the above circumstances provided the trigger of poor network conditions occurs then the system will be arranged to enter virtual islanding mode for a sufficient time to elongate the period over which the main distribution network collapses to a gradual change rather than a sudden collapse. In such circumstances the emergency generators have time to reach their synchronising speeds or can be synchronised appropriately and clearly, the controller can then continue with the virtual islanding process by considering local group distribution networks of power sources, whether they be main load or emergency power sources to effectively segment and island the overall main distribution network for quarantining as well as continued operation.

Generally, switch on and synchronising for an emergency generator utilising a reciprocating engine as a primary mover will take less than 20 seconds. The virtual islanding achieved by methods in accordance with aspects of the present invention and utilisation of a controller in such circumstances will maintain or at least attempt to maintain main distribution network stability at an acceptable level for this time period so that most of the main distribution network in terms of prioritised power loads can be maintained. Furthermore, by utilisation of such emergency generators fuel and running costs can be minimised whilst providing redundancy and sufficiency for continued seamless backup generation within the overall main distribution network.

By appropriate modes of operation it will be understood that aspects of the present invention provide a distributed power generation system and method of operating such a system which has greater potential for utilisation than conventional emergency generators. Such conventional emergency generators will depend upon load shedding algorithms which have less flexibility and will be susceptible to sudden transition to an island state. Aspects of the present pre-configure the main distribution network into virtual local group distribution networks, or virtual islands, such that transfer to practical islands is less abrupt and potentially seamless should a network fault actually occur. Clearly, aspects of the present invention depend upon consideration of a set of criteria as a pre-indicator of potential onset of a network fault. In such circumstances care must be taken with regard to the set of criteria and the divergence from that criteria as triggers for establishing virtual islands.

The size of virtual islands can vary. It will be appreciated for absolute protection a power source in the form of the transportable generator or emergency generator may be linked to one electrical power load as a local group distribution network and therefore a virtual island. In such circumstances with the onset of the divergence from the set of criteria for the main distribution network the electrical power source will be dedicated to that prioritised power load in preference to electrical power supply to the remainder of the main distribution network. Clearly, providing a one to one relationship between power sources and power loads will be impractical for a main distribution network wide consideration as local group distribution networks. Consequently local group distribution networks may comprise one or more power sources associated with one or more power loads prioritised appropriately. The controller will be arranged dependent upon the power load prioritisation as well as capacity in terms of power sources in defining acceptable local group distribution networks as virtual islands.

Clearly, establishing virtual islands as indicated provides hypothecation of electrical power sources with electrical power loads. Such hypothecation and dedication in a virtual island in presumptive normal operation for the main distribution network is contrary to the general objectives of such distributed power generation systems. As indicated above a principal objective of a main distribution network is to create flexibility in terms of the number of power sources which can provide electrical power to the main distribution network such that the cheapest or most reliable or cleanest sources can be used in preference to more expensive, less reliable and more variable sources. Hypothecation of electrical power sources to power loads will limit such flexibility by operating services which otherwise would not be used and advanced prioritising of electrical power loads in terms of providing sufficient electrical power to those power loads should a virtual island be created either unintentionally or deliberately. The virtual islands in terms of local group distribution networks of power sources and power loads in such circumstances can be considered configuration of the main distribution network as a re-configuration of the main distribution network for expectation of problems rather than efficiency, cost or even reliability of delivery by the whole system.

Distributed power generation systems and methodology as described above can be utilised in a number of situations. Thus for example the electrical power sources may be used in marine systems or systems utilised in aviation.

Modifications and alterations to aspects of the present invention will be appreciated by persons skilled in the technology. Thus for example as described above levels of constriction to the virtual islands in terms of the closeness of matching or electrical power sources with electrical power demands within a local group distribution network can vary proportionately to the degree of divergence from the set of criteria. It will be understood that the closest to a virtual island created the greater reduction in flexibility with regard to objective distribution network operation. Consequently for small diversions from the set of criteria the controller and methodology will only restrict to the virtual island to a limited extent whilst large and sustained deviations from the set of criteria may pre-empt the distribution network more closely in terms of the prescribed virtual island in view of the more likely imminence of a practical island occurring due to such degradation in network performance.

The invention claimed is:

1. A method of operating a distributed power generation system comprising a plurality of electrical power sources and a plurality of electrical loads, interconnected by a main distribution network, one or more switches for forming one or more local group distribution networks, each local distribution network comprising at least one electrical power source and at least one electrical load, the method comprising:
   (i) monitoring the main distribution network by comparing the electrical power flow with a set of criteria, the criteria being indicative of an impending disconnection of the local distribution network from the main distribution network,
   (ii) determining if the electrical power flow on the main distribution network diverges from the set of criteria,
   (iii) maintaining the switch between at least one of the local group distribution networks and the main distribution network closed,
   (iv) preemptively configuring the at least one of the local group distribution networks in preparation of the local group distribution network being disconnected from the main distribution network whereby the electrical power from the or each electrical power source within the at least one of the local group distribution networks substantially matches the electrical power requirements of the electrical loads in the at least one of the local group distribution networks if the electrical power flow in the main distribution network diverges from the set of criteria, and
   (v) shedding electrical loads within the at least one of the local group distribution networks.

2. A method as claimed in claim 1 comprising identifying priority electrical loads within the at least one of the local group distribution network and ensuring the priority electrical loads are preferentially incorporated within the local group distribution network in preference to lesser priority electrical loads.

3. A method as claimed in claim 1 comprising controlling the power output of the electrical power sources within the at least one of the local group distribution networks.

4. A method as claimed in claim 1 comprising reducing power exchange between the at least one of the local group distribution networks and the main distribution network.

5. A method as claimed in claim 4 comprising reducing power exchange between the at least one of the local group distribution networks and the main distribution network to zero.

6. A method as claimed in claim 1 comprising initiating operation of at least one emergency electrical generator.

7. A method as claimed in claim 1 comprising determining if the electrical power flow on the main distribution network diverges from the set of criteria repeatedly with a set time period between each determination.

8. A method as claimed in claim 7 wherein the time period is more than once a second.

9. A method as claimed in claim 1 wherein the set of criteria comprises at least one of voltage, current, frequency, fluctuation, imbalance, flicker or harmonics of the electrical power flow.

10. A distributed power generation system comprising a plurality of electrical power sources and a plurality of electrical loads interconnected by a main distribution network, one or more switches for forming one or more local group distribution networks, each local group distribution network comprising at least one electrical power source and at least one electrical load, the distributed power generation system comprising at least one controller arranged to:
   (i) monitor the main distribution network by comparing the electrical power flow with a set of criteria, the set of criteria being indicative of an impending disconnection of the local distribution network from the main distribution network;
   (ii) determine if the electrical power flow on the main distribution network diverges from the set of criteria,
   (iii) maintain the switch between the at least one of the local group distribution networks and the main distribution network closed,
   (iv) preemptively configure the at least one of the local group distribution networks in preparation of the local group distribution network being disconnected from the main distribution network whereby the electrical power from the or each electrical power source with the at least one of the local group distribution networks substantially matches the electrical power requirements of the electrical loads in the at least one of the local group distribution networks if the electrical power flow in the main distribution network diverges from the criteria, and (v) operate switches to shed electrical loads within the at least one of the local group distribution networks.

11. A distributed power generation system as claimed in claim 10 wherein the controller is arranged to control the power output of the electrical power sources within the at least one of the local group distribution networks.

12. A distributed power generation system as claimed in claim 10 wherein the controller is arranged to reduce the power exchange between the at least one of the local group distribution networks and the main distribution network.

13. A distributed power generation system as claimed in claim 10 wherein the controller is arranged to initiate operation of the at least one emergency electrical generator.

14. A distributed power generation system as claimed in claim 10 wherein the controller is arranged to determine if the electrical power flow on the main distribution network diverges from the set of criteria repeatedly with a set time period between each determination.

15. A distributed power generation system as claimed in claim 10 wherein the set of criteria comprises at least one of voltage, current, frequency, fluctuation, imbalance, flicker or harmonics of the electrical power flow.

* * * * *